US009634716B2

(12) United States Patent
Haralabidis et al.

(10) Patent No.: US 9,634,716 B2
(45) Date of Patent: Apr. 25, 2017

(54) ENHANCED GRANULARITY OPERATIONAL PARAMETERS ADJUSTMENT OF COMPONENTS AND MODULES IN A MULTI-BAND, MULTI-STANDARD COMMUNICATION DEVICE

(71) Applicant: BROADCOM CORPORATION, Irvine, CA (US)

(72) Inventors: Nikolaos C. Haralabidis, Athens (GR); Theodoros Georgantas, Haidari (GR)

(73) Assignee: Avago Technologies General IP (Singapore) Pte. Ltd, Singapore (SG)

(*) Notice: Subject to any disclaimer, the term of this patent is extended or adjusted under 35 U.S.C. 154(b) by 54 days.

(21) Appl. No.: 14/639,465

(22) Filed: Mar. 5, 2015

(65) Prior Publication Data

US 2015/0188598 A1 Jul. 2, 2015

Related U.S. Application Data

(63) Continuation of application No. 13/902,842, filed on May 26, 2013, now Pat. No. 8,989,808, which is a (Continued)

(51) Int. Cl.
*H04B 1/40* (2015.01)
*H04B 1/403* (2015.01)
(Continued)

(52) U.S. Cl.
CPC ............ *H04B 1/406* (2013.01); *H04B 1/005* (2013.01); *H04W 88/06* (2013.01)

(58) Field of Classification Search
CPC ........ H04B 1/406; H04B 1/005; H04W 88/06
(Continued)

(56) References Cited

U.S. PATENT DOCUMENTS 6,625,424 B1 * 9/2003 Mohindra ................ H03C 3/40 455/82
6,766,148 B1 * 7/2004 Mohindra ................ H04B 1/04 329/336
(Continued)

*Primary Examiner* — April G Gonzales
(74) *Attorney, Agent, or Firm* — Garlick & Markison; Shayne X. Short

(57) ABSTRACT

Enhanced granularity operational parameters adjustment of components and modules in a multi-band, multi-standard communication device. For supporting two-way communications, a communication device includes receiver and transmitter modules. Each module includes various components that are configurable and/or programmable based on a protocol and band pair by which the communication device is operating. The communication device is a multi-protocol and multi-band capable communication device capable to operate in accordance with any one protocol and band at a first time and another protocol and band at a second time. The various components within each of the receiver and transmitter modules can be adjusted using one or more operational parameters. In some instances, a given component can be controlled by more than one operational parameter. Alternatively, certain components are controlled only one operational parameter. The operational parameters that configure the components may be calculated, retrieved from a memory, and/or determined using other means.

20 Claims, 16 Drawing Sheets

Related U.S. Application Data continuation of application No. 12/119,086, filed on May 12, 2008, now Pat. No. 8,452,241.

(60) Provisional application No. 61/042,583, filed on Apr. 4, 2008.

(51) Int. Cl.
*H04B 1/00* (2006.01)
*H04W 88/06* (2009.01)

(58) Field of Classification Search
USPC .......................................................... 455/77
See application file for complete search history.

(56) References Cited

U.S. PATENT DOCUMENTS

| | | | | |
|---|---|---|---|---|
| 7,768,963 | B2 * | 8/2010 | Alizadeh-Shabdiz | G01S 5/02<br>342/109 |
| 8,165,544 | B2 * | 4/2012 | Tran | H04B 1/006<br>455/132 |
| 2003/0016695 | A1 * | 1/2003 | Sabet | H04J 14/02<br>370/465 |
| 2004/0192222 | A1 * | 9/2004 | Vaisanen | H04B 1/44<br>455/78 |
| 2006/0270449 | A1 * | 11/2006 | Kim | H04B 1/034<br>455/552.1 |
| 2007/0207752 | A1 * | 9/2007 | Behzad | H04B 1/406<br>455/132 |
| 2007/0275746 | A1 * | 11/2007 | Bitran | H04W 72/0446<br>455/509 |

* cited by examiner

1400

| Standard | Band | Fcomp (MHz) | Region |
|---|---|---|---|
| 3GPP Rel. 8 FDD | Band I | 312.00 | AU, EU, JP |
| 3GPP Rel. 8 FDD | Band II | 184.88 | NA |
| 3GPP Rel. 8 FDD | Band III | 249.60 | EU |
| 3GPP Rel. 8 FDD | Band IV | 312.00 | NA |
| 3GPP Rel. 8 FDD | Band V | 312.00 | AU, NA |
| 3GPP Rel. 8 FDD | Band VI | 312.00 | JP |
| 3GPP Rel. 8 FDD | Band VII | 293.65 | EU |
| 3GPP Rel. 8 FDD | Band VIII | 293.65 | EU |
| 3GPP Rel. 8 FDD | Band IX | 232.96 | JP |
| 3GPP Rel. 8 FDD | Band X | 312.00 | NA |
| 3GPP Rel. 8 FDD | Band XI | 232.96 | JP |
| 3GPP Rel. 8 FDD | Band XII | 312.00 | TBD |
| 3GPP Rel. 8 FDD | Band XIII | 312.00 | TBD |
| 3GPP Rel. 8 FDD | Band XIV | 312.00 | TBD |
| 3GPP Rel. 8 FDD | Band XV | 312.00 | TBD |
| 3GPP Rel. 8 FDD | Band XVI | 312.00 | TBD |
| EGPRS | GSM850 | 312.00 | NA |
| EGPRS | EGSM900 | 293.65 | AU, EU |
| EGPRS | DCS1800 | 312.00 | AU, EU |
| EGPRS | PCS1900 | 312.00 | NA |

| TX Path: VCO & LO Generation Properties Adjustment | | | | | | | | | |
|---|---|---|---|---|---|---|---|---|---|
| 3GPP | spec: PN dBc@duplex freq. | | VCOfreq | PN @VCO | LO Div | LOfreq (MHz) | PN @LO | LO Drive | VCO Drive |
| Band XV | -171 @700M | | 3820 | -171 | 2x | 1910 | -177 | 2 | 2 |
| Band IV | -171 @400M | | 3460 | -171 | 2x | 1730 | -177 | 3 | 3 |
| Band X | -171 @400M | | 3480 | -171 | 2x | 1740 | -177 | 3 | 3 |
| Band I | -171 @190M | | 3900 | -171 | 2x | 1950 | -177 | 3 | 3 |
| Band VII | -171 @120M | | 5070 | -171 | 2x | 2535 | -177 | 4 | 4 |
| Band III | -166 @95M | | 3480 | -166 | 2x | 1740 | -172 | 3 | 3 |
| Band IX | -166 @95M | | 3530 | -166 | 2x | 1765 | -172 | 3 | 3 |
| Band II | -166 @80M | | 3760 | -166 | 2x | 1880 | -172 | 3 | 3 |
| Band XI | -165 @45M | | 2880 | -159 | 2x | 1440 | -171 | 2 | 2 |
| Band V | -165 @45M | | 3344 | -159 | 4x | 836 | -171 | 1 | 1 |
| Band VI | -165 @45M | | 3340 | -159 | 4x | 835 | -171 | 1 | 1 |
| Band VIII | -165 @45M | | 3580 | -159 | 4x | 895 | -171 | 1 | 1 |
| Band XII | -165 @30M | | 4230 | -156 | 6x | 705 | -171 | 1 | 1 |
| Band XIII | -165 @30M | | 4710 | -156 | 6x | 785 | -171 | 1 | 1 |
| GSM BANDS | spec: PN @10M | spec: PN @20M | VCOfreq | PN @VCO | LO Div | LOfreq (MHz) | PN @LO | LO Drive | VCO Drive |
| GSM850 | -164 | -170 | 3344 | -152 | 4x | 836 | -164 | 3 | 2 |
| EGSM900 | -164 | -170 | 3580 | -152 | 4x | 895 | -164 | 3 | 2 |
| DCS1800 | --- | -162 | 3480 | -156 | 2x | 1740 | -162 | 3 | 3 |
| PCS1900 | --- | -162 | 3760 | -156 | 2x | 1880 | -162 | 3 | 3 |

| RX Path: VCO & LO Generation Properties Adjustment | | | | | | |
|---|---|---|---|---|---|---|
| **3GPP** | **spec: PN dBc@2.7M** | **PN @VCO** | **LO Div** | **PN @LO** | **LO Drive** | **VCO Drive** |
| XV, IV, X, I, VII, III, IX, II, XI | -121 | -121 | 2x | -127 | 2 | 2 |
| V, VI, VIII | -121 | -115 | 4x | -127 | 2 | 1 |
| XII, XIII | -121 | -112 | 6x | -127 | 2 | 1 |
| **GSM BANDS** | **spec: PN dBc@3M** | **PN @VCO** | **LO Div** | **PN @LO** | **LO Drive** | **VCO Drive** |
| DCS1800/PCS1900 | -145 | -145 | 2x | -151 | 4 | 3 |
| GSM850/900 | -145 | -139 | 4x | -151 | 3 | 2 |

Fig. 16

ENHANCED GRANULARITY OPERATIONAL PARAMETERS ADJUSTMENT OF COMPONENTS AND MODULES IN A MULTI-BAND, MULTI-STANDARD COMMUNICATION DEVICE

CROSS REFERENCE TO RELATED PATENTS/PATENT APPLICATIONS

The present U.S. Utility Patent Application claims priority pursuant to 35 U.S.C. §120 as a continuation of U.S. Utility application Ser. No. 13/902,842, entitled "Enhanced granularity operational parameters adjustment of components and modules in a multi-band, multi-standard communication device," filed May 26, 2013, and scheduled subsequently to be issued as U.S. Pat. No. 8,989,808 on Mar. 24, 2015 (as indicated in an ISSUE NOTIFICATION mailed from the USPTO on May 4, 2015), which is a continuation of U.S. Utility application Ser. No. 12/119,086, entitled "Enhanced granularity operational parameters adjustment of components and modules in a multi-band, multi-standard communication device," filed May 21, 2008, now U.S. Pat. No. 8,452,241, which claims priority pursuant to 35 U.S.C. §119(e) to U.S. Provisional Application No. 61/042,583, entitled "Dynamic frequency planning at IC level," filed Apr. 4, 2008, all of which are hereby incorporated herein by reference in their entirety and made part of the present U.S. Utility Patent Application for all purposes.

BACKGROUND OF THE INVENTION

Technical Field of the Invention

The invention relates generally to communication systems; and, more particularly, it relates to configurable and adaptable communication devices implemented within such communication systems.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (where x is 16, 64, 128, 256, etc. for various types of quadrature amplitude modulation (QAM)), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

Moreover, even greater complexity can arise when designing a communication device that is capable to operate within multiple types of communication systems and/or in accordance with different standards. The real estate consumption and circuitry complexity can be large when attempting to design such communication devices. As the desire for multi-standard capable communication devices continues to grow, there is continuing need in the art for efficient means by which such communication devices may be designed and realized in a cost-effective and efficient way.

BRIEF DESCRIPTION OF THE SEVERAL VIEWS OF THE DRAWINGS

FIG. 14 is a diagram illustrating a table of an embodiment of operational parameter selection of comparison frequency based on various protocol and band pairs.

FIG. 15 is a diagram illustrating a table of an embodiment of operational parameter adjustment for Voltage Controlled Oscillator (VCO) and Local Oscillator (LO) in a transmit (TX) path of a device.

FIG. 16 is a diagram illustrating a table of an embodiment of operational parameter adjustment for VCO LO in a receive (RX) path of a device.

DETAILED DESCRIPTION OF THE INVENTION

Figure 1:
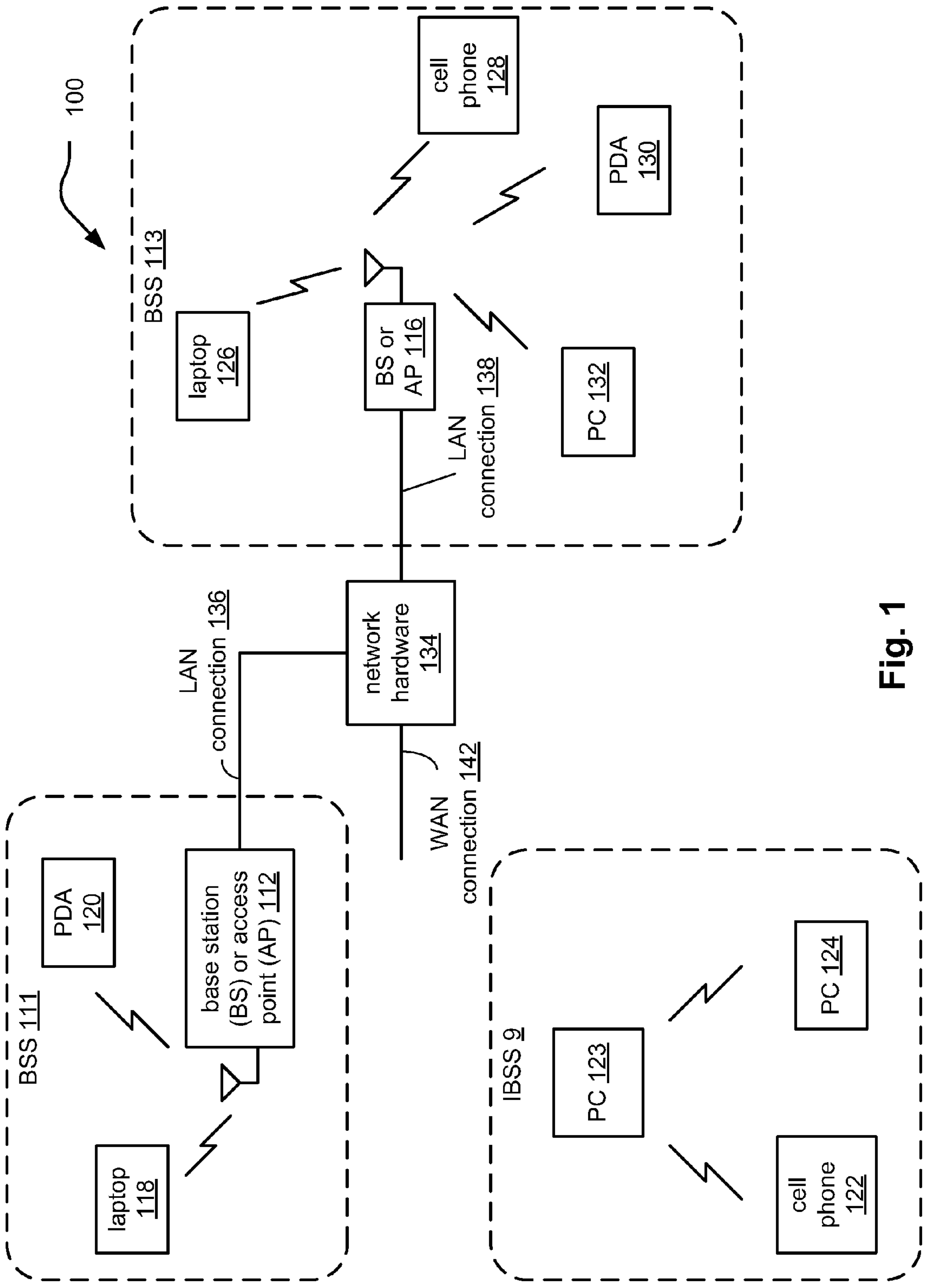
FIG. 1 is a diagram illustrating an embodiment of a wireless communication system.

A novel approach is presented herein by which a high degree of granularity in terms of adjustment, configuration, and programmability of various components within a communication device can be effectuated. Particularly within a communication device that is multi-protocol and multi-band capable, this increased granularity of adjusting the various components within either one or both of a transmitter module and a receiver module of a communication device allows for a less energy/power consumptive architecture as well as better usage and layout of the real estate (e.g., the individual components within one or more integrated circuits within the communication device) within the communication device.

In some embodiments, the adjustment of the various components within either one or both of a transmitter module and a receiver module of a communication device is made based on a selected protocol and band pair being employed when operating the communication device at a given time. The communication device can operate in accordance with a first protocol and band pair during a first time and operate in accordance with a second protocol and band pair during a second time, and so on.

This adjustability/configurability can be referred to as providing for dynamic frequency planning at the integrated circuit (IC) level of the communication device. Typically, for supporting two-way communications, a communication device includes a receiver module and a transmitter module. Each of these modules includes a number of corresponding components that are configurable and/or programmable based on a protocol and band pair by which the communication device is operating. The communication device is a multi-protocol and multi-band capable communication device capable to operate in accordance with any one protocol and band at a first time and another protocol and band at a second time. The various components within each of the receiver and transmitter modules can be adjusted using one or more operational parameters. In some instances, a given component can be controlled by more than one operational parameter. Alternatively, certain components are controlled by only one operational parameter. The operational parameters that configure the components may be calculated, retrieved from a memory, and/or determined using other means.

These principles can be applied generally to any communication device operating within a wide variety of communication system types. Within certain wireless communication systems, a mobile terminal can communicate with a base station, and vice versa. Either of these communication devices can be viewed as being a transceiver (e.g., supporting transmit and receive functionality therein).

When considering a multi-protocol/multi-band capable mobile terminal transceiver, during the transmit operation, the mobile terminal transceiver is allowed to broadcast in specific frequency bands and at a specific power level as set by the communication standards requirements applicable for each band designated for commercial/public use or otherwise. Generally speaking, relatively strict restrictions apply to any given communication made to or from a communication device so that the operation of the communication device (when sending or receiving a communication) does not interfere with other wireless communications and broadcasts.

Moreover, due to the comparison frequency ($F_{comp}$) used at the transmit (TX) synthesizer within a communication device, several harmonic and intermodulation tones are typically produced at the output of the transmitter module. Their location in the frequency spectrum and transmitted power for each one must comply with the respective communication standard/protocol requirements for the frequency band in use.

The harmonics (spurious emissions), depicted below as $F_{harm}$, produced by this may be calculated as follows:

$$F_{harm}=F_{TX}\pm(N\times F_{comp}),$$

where N is an integer positive number. The variable, $F_{TX}$, is the transmit frequency for a protocol and band pair (e.g., based on a particular communication standard).

When considering such a multi-protocol/multi-band capable mobile terminal transceiver, during the receive operation, due to the comparison frequency ($F_{comp}$) used at the receive (RX) synthesizer, several harmonic and intermodulation tones are produced that may down-convert unwanted signals and degrade the receiver module's performance. The receiver module should achieve certain performance regarding: linearity (measured via IIP3 and IIP2), Noise Figure (NF), Local Oscillator (LO) frequency power emission from the antenna, etc.

These principles referred to above are valid regardless of the specific system architecture used in the communication device. The principles described above should be met with (ideally) a minimum possible power consumption for extended battery life (e.g., particularly in mobile and/or handheld devices) and also require a relatively minimum Bill Of Material (BOM) for reduced implementation size and cost of such an apparatus.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, et cetera, provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
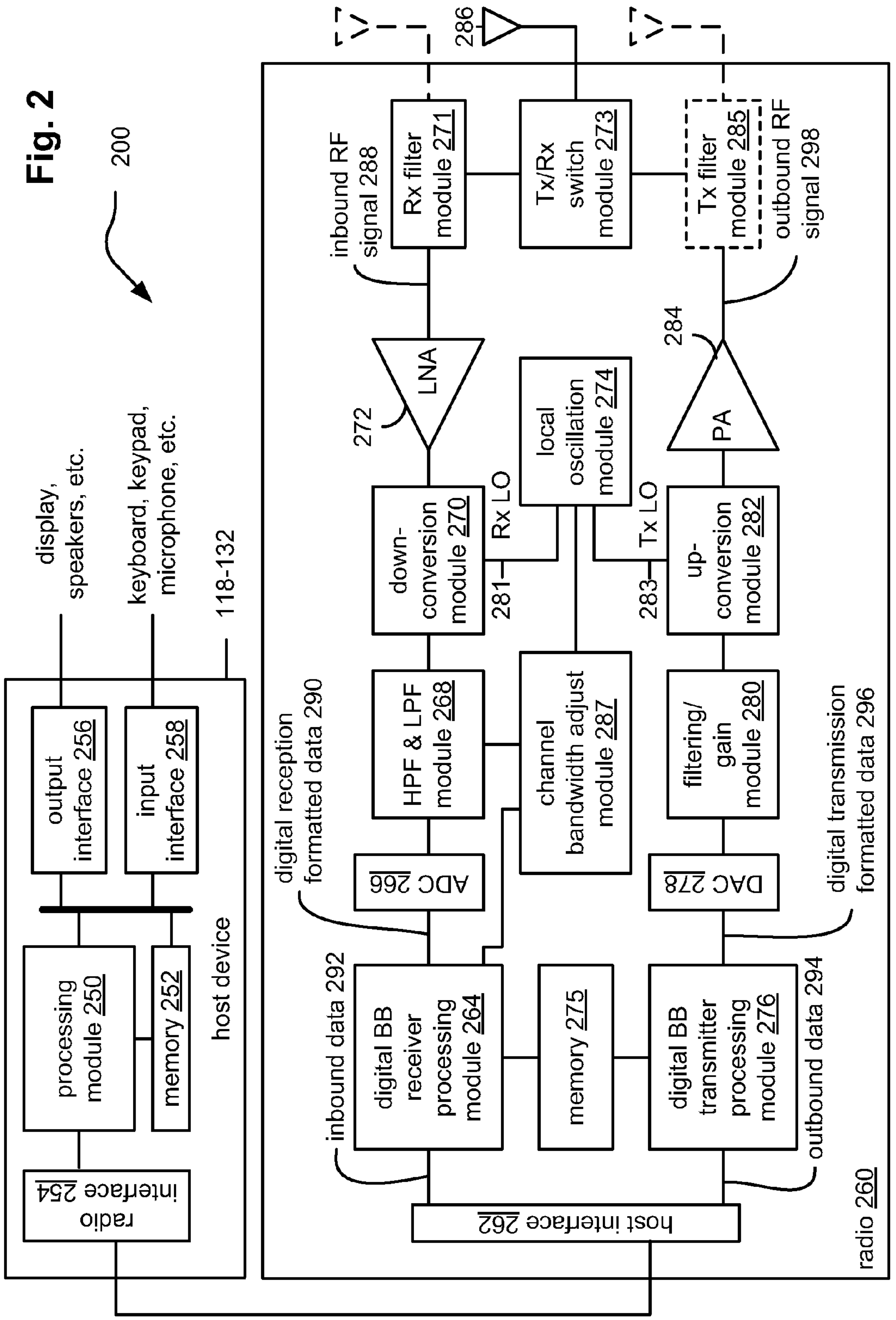
FIG. 2 is a diagram illustrating an embodiment of a wireless communication device.

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera, such that the received data may be displayed. The radio interface 254 also provides data from the processing module 250 to the radio 260. The processing module 250 may receive the outbound data from an input device such as a keyboard, keypad, microphone, et cetera, via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285 (which may not be required in all embodiments), a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

With respect to the transmitter filter module 285, it is noted that not every radio access RAT (Radio Access Technology) and frequency band may require transmitter filtering. In other embodiments, the transmitter filtering may be performed by a duplexer module that exists in a power amplifier output (e.g., such as in the power amplifier 284 in some embodiments) for Code Division Multiple Access (CDMA) simultaneous receive and transmit operation.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Figure 3:
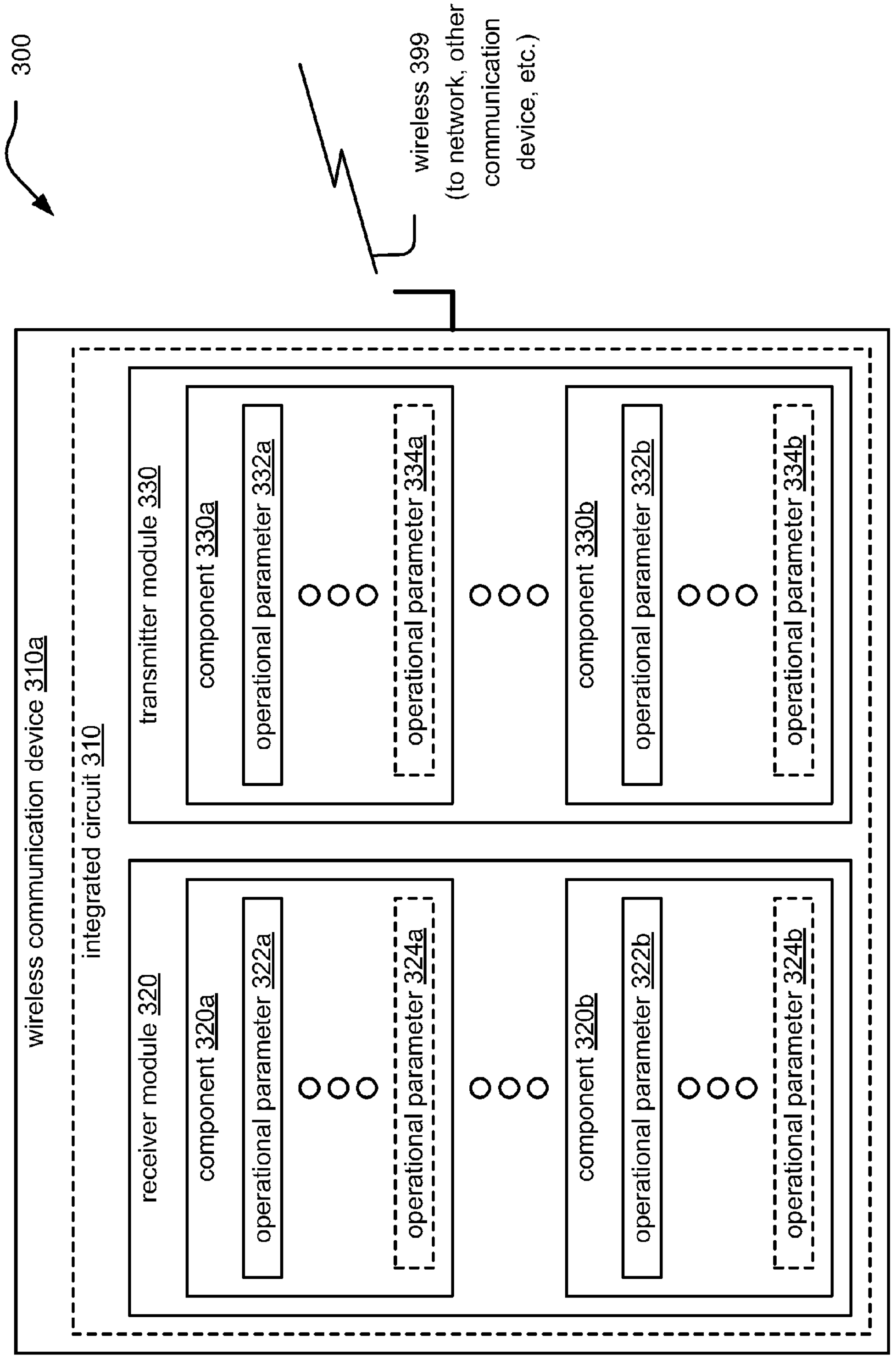
FIG. 3 is a diagram illustrating an alternative embodiment of a wireless communication system including a wireless communication device that includes a receiver module and a transmitter module.

FIG. 3 is a diagram illustrating an alternative embodiment of a wireless communication system 300 including a wireless communication device 310*a* that includes a receiver module 320 and a transmitter module 330.

The wireless communication device 310*a* can communicate via a wireless communication channel 399 to a communication network and/or one or more other communication devices. The receiver module 320 and the transmitter module 330 may be implemented within an integrated circuit 310 (or alternatively within more than one integrated circuit) within the wireless communication device 310*a*.

Each of the receiver module 320 and the transmitter module 330 includes a number of components. For example, the receiver module 320 includes component 320*a* up to component 320*b*. Each of the component 320*a* and the component 320*b* can include one or more operational parameters that control the operation of that particular component. These operational parameters can be fixed or adjustable.

Within the receiver module 320, the operation of component 320*a* can be modified based on the adjustment of any one or more of operational parameter 322*a* up to operational parameter 324*a*, and the operation of component 320*b* can be modified based on the adjustment of any one or more of operational parameter 322*b* up to operational parameter 324*b*.

Within the transmitter module 330, the operation of component 330*a* can be modified based on the adjustment of any one or more of operational parameter 332*a* up to operational parameter 334*a*, and the operation of component 330*b* can be modified based on the adjustment of any one or more of operational parameter 332*b* up to operational parameter 334*b*.

In some embodiments, the adjustment of the various operational parameters that control operation of one or more of the components within each of the receiver module 320 and the transmitter module 330 may be performed based on a selected protocol and band pair by which the wireless communication device 310*a* is to operate at a given time. In accordance with multi-protocol and multi-band operation by the wireless communication device 310*a*, the wireless communication device 310*a* can operate in accordance with a first protocol and band pair during a first time and in accordance with a second protocol and band pair during a second time.

As such, any one or more of the various operational parameters that control operation of one or more of the components within each of the receiver module 320 and the transmitter module 330 may be adjusted based on a change of a protocol and band pair.

Figure 4:
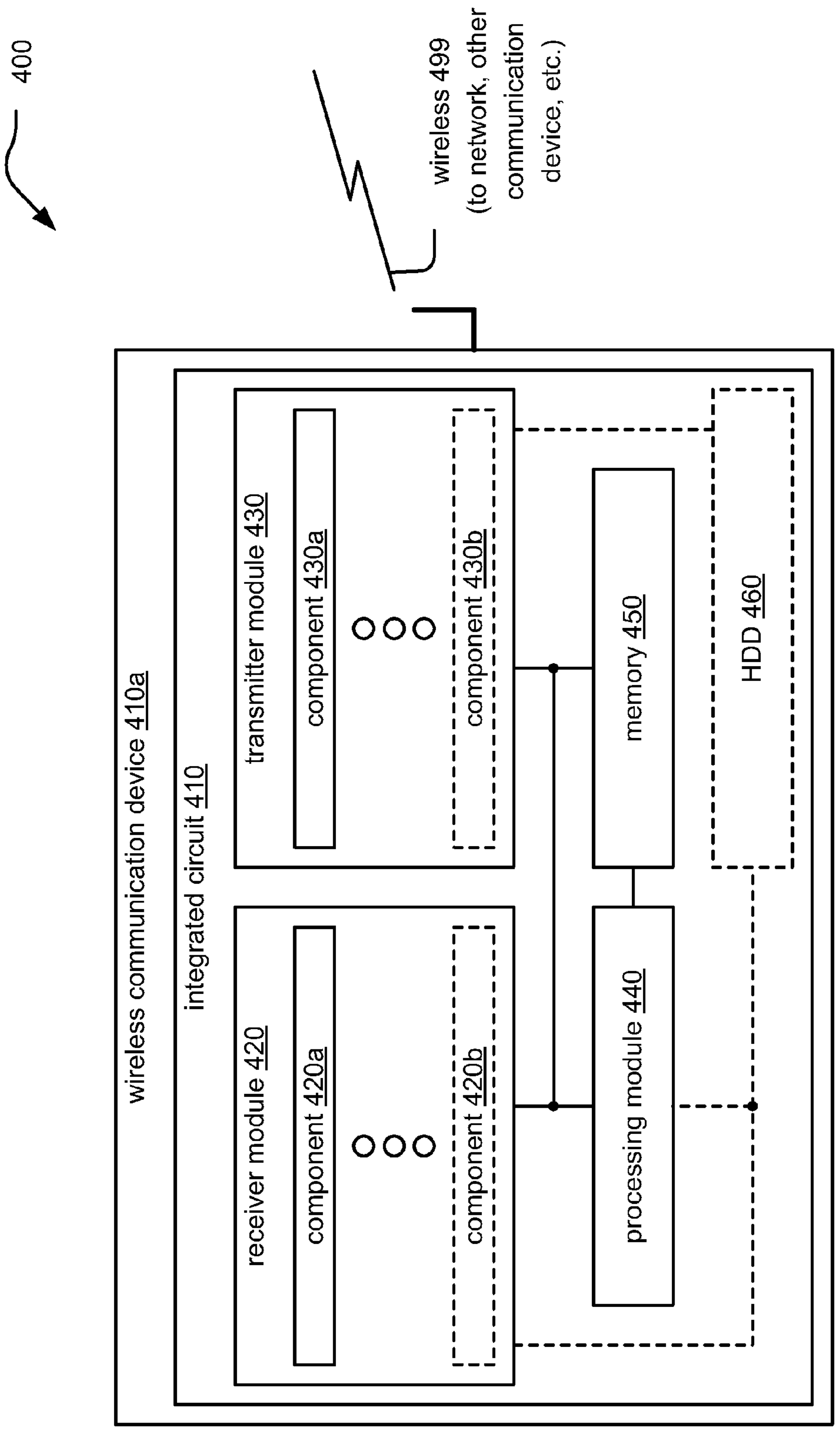
FIG. 4 is a diagram illustrating an alternative embodiment of a wireless communication system including a wireless communication device that includes a receiver module and a transmitter module and means for calculating and/or storing various operational parameters employed therein.

FIG. 4 is a diagram illustrating an alternative embodiment of a wireless communication system 400 including a wireless communication device 410*a* that includes a receiver module 420 and a transmitter module 430 and means for calculating and/or storing various operational parameters employed therein.

The wireless communication device 400 can communicate via a wireless communication channel 499 to a communication network and/or one or more other communication devices. The receiver module 420 and the transmitter module 430 may be implemented within an integrated circuit 410 (or alternatively within more than one integrated circuit) within the wireless communication device 410*a*.

Somewhat analogous to the previous embodiment, the receiver module 420 and the transmitter module 430 of this embodiment can include a number of components. For example, the receiver module 420 includes component 420*a* up to component 420*b*. Each of the component 420*a* and the component 420*b* can include one or more operational parameters that control the operation of that particular component. These operational parameters can be fixed or adjustable. The transmitter module 430 includes component 430*a* up to component 430*b*. Each of the component 430*a* and the component 430*b* can include one or more operational parameters by the operation of that particular component is controlled. These operational parameters can be fixed or adjustable.

The means by which the various operational parameters are adjusted, configured, or programmed may be varied. In one embodiment, a processing module 440 calculates the operational parameters and tunes them appropriately within the receiver module 420 and/or transmitter module 430.

If desired, a memory 450 may be coupled to the processing module 440. It is noted that the various modules (e.g., processing modules, digital BB processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in the memory 450. The memory 450 may be a single memory device or a plurality of memory devices. Such a memory device 450 may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

Alternatively, the memory 450 may simply store predetermined values for each of the operational parameters and the respective components get tuned appropriately based on the retrieval of those operational parameters from the memory 450. Similarly, any other storage device (e.g., a hard disk drive (HDD) 460) could be employed to store predetermined values for each of the operational parameters as well.

Moreover, the processing module 440 can operate cooperatively with the memory 450 and/or the HDD 460 in which one or more operational parameters are calculated by the processing module 440 and one or more operational parameters are retrieved from the memory 450 and/or the HDD 460. In certain embodiments, the operational parameters may be updated based on operating conditions, past history of operation, etc. These updated and/or modified operational parameters may be updated within the memory 450 and/or the HDD 460. In such an embodiment, the memory 450 and/or the HDD 460 can be employed to store the most recent values of the operational parameters for a given mode of operation.

Figure 5:
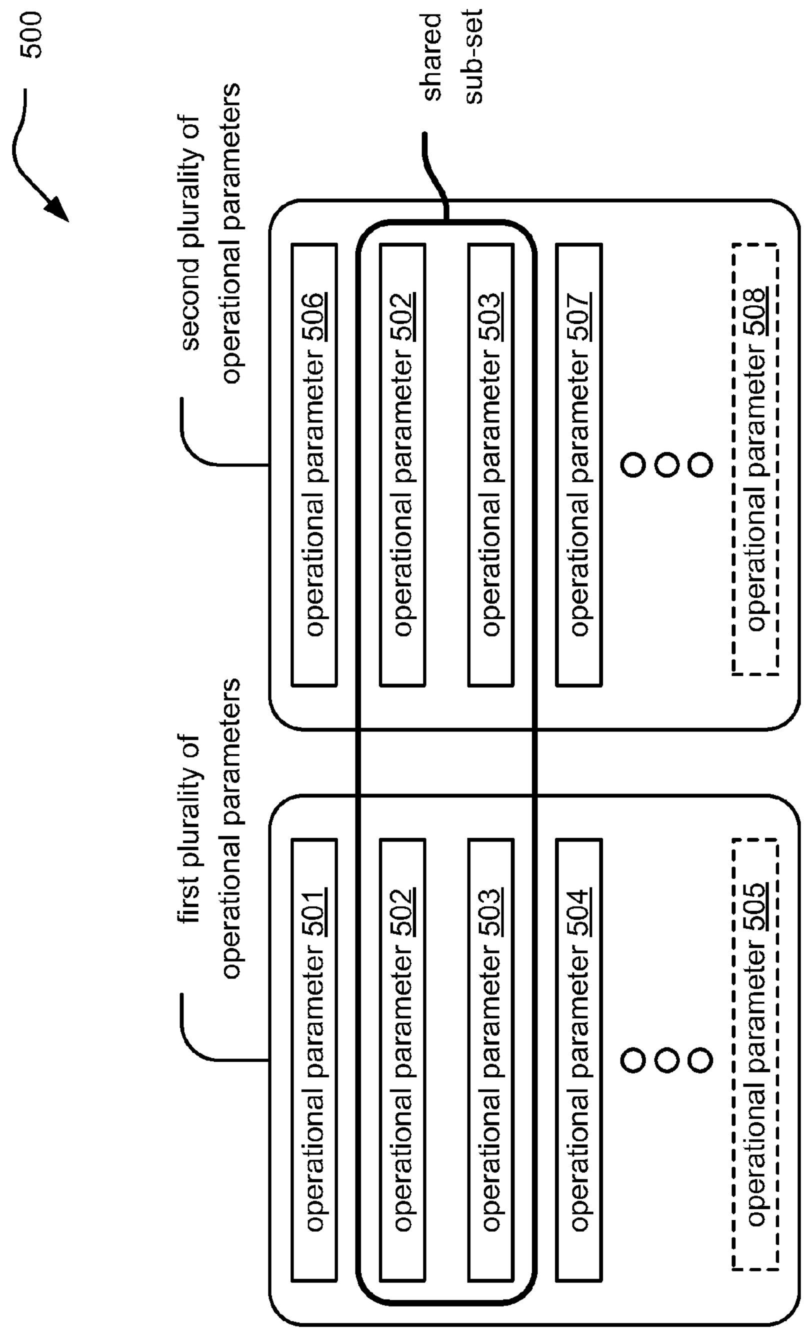
FIG. 5 is a diagram illustrating an embodiment of grouping of various pluralities of operational parameters.

FIG. 5 is a diagram illustrating an embodiment 500 of grouping of various pluralities of operational parameters. As mentioned above with respect to other embodiments, various components within either one or both of a transmitter module or a receiver module of a communication device can be adjusted based on a selected protocol and band pair by which the communication device is operating at a given time. This diagram shows a first plurality of operational parameters and a second plurality of operational parameters. The first plurality of operational parameters includes an operational parameter 501, an operational parameter 502, an operational parameter 503, an operational parameter 504, up to an operational parameter 505. These various operational parameters within the first plurality of operational parameters may be employed to control more than one component within either one or both of a transmitter module or a receiver module of a communication device. The second plurality of operational parameters includes an operational parameter 506, the operational parameter 502, the operational parameter 503, an operational parameter 507, up to an operational parameter 508.

As can be seen, the operational parameter 502 and the operational parameter 503 are common to both the first plurality of operational parameters and the second plurality of operational parameters. This may be viewed as being a shared sub-set of operational parameters employed when the communication device operates in accordance with a first selected protocol and band pair in which at least some components of the communication device are adjusted using the first plurality of operational parameters and when the communication device operates in accordance with a second selected protocol and band pair in which at least some components of the communication device are adjusted using the second plurality of operational parameters.

It is noted that although different pluralities of operational parameters can be employed based on at least two different selected protocol and band pairs, the principles presented herein by which different pluralities of operational parameters can be employed can also be extended to adjusting the operational parameters based on other considerations including, though not limited to, the operating conditions of the communication device, the past operational history of the communication device, the communication system type in which the communication device is operating, and/or other consideration.

Figure 6:
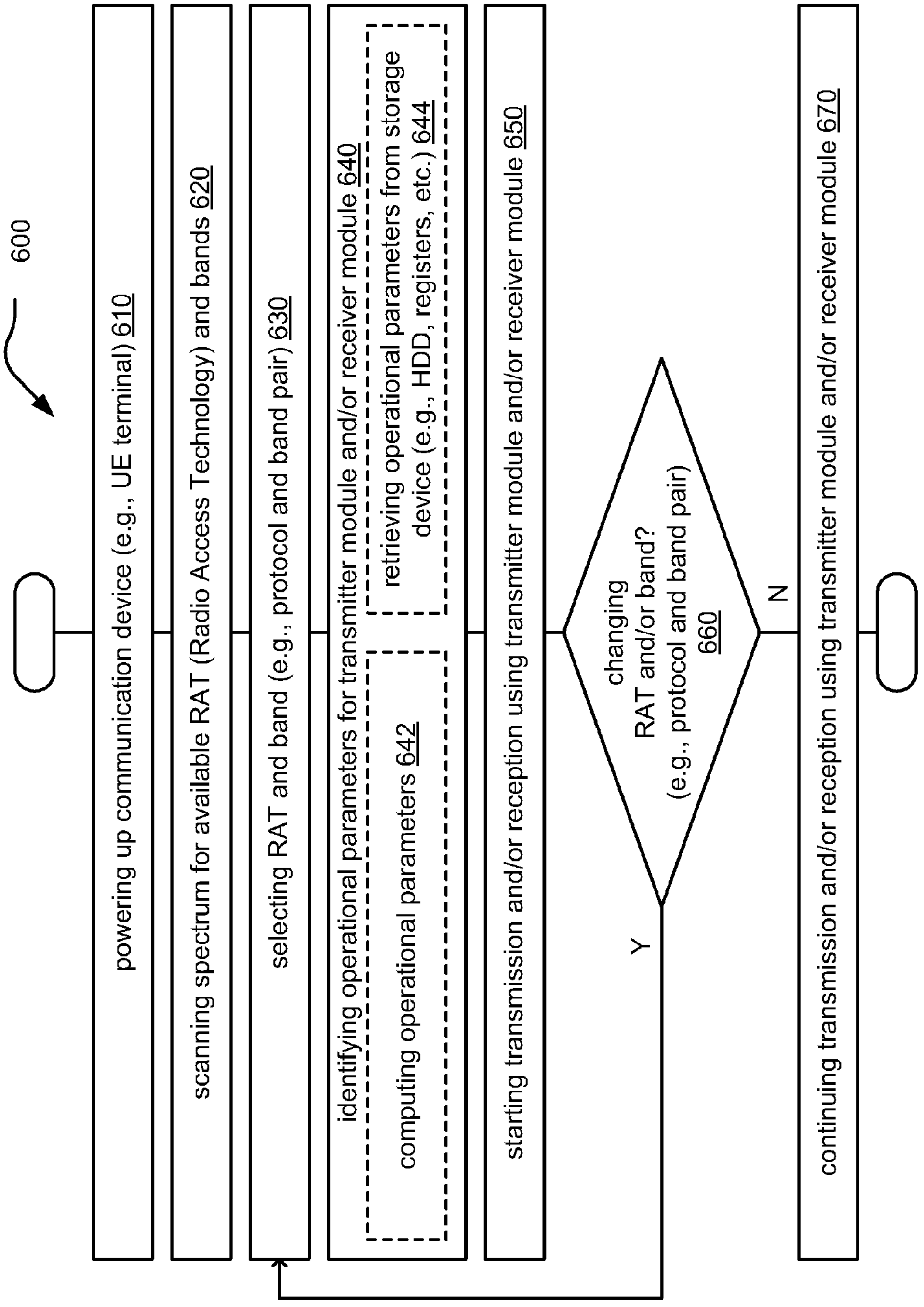
FIG. 6 is a diagram illustrating an embodiment of a method for configuring and operating a communication device based on a selected protocol and band pair and selected operational parameters.

FIG. 6 is a diagram illustrating an embodiment of a method 600 for configuring and operating a communication device based on a selected protocol and band pair and selected operational parameters.

As can be seen in a block 610, the method 600 operates by powering up a communication device (e.g., a UE terminal or user equipment terminal). This operation can be viewed as being initialization. The method 600 continues by scanning a spectrum for available RAT (Radio Access Technology) and bands, as shown in a block 620. This scanning operation may be viewed as being air scanning of the available protocols (RAT) and operating bands. This may also be viewed as scanning for an available protocol and band pair that may be employed by the communication device. Oftentimes, a protocol can operate in accordance with a high frequency and a low frequency band. In other words, for a given protocol, there may two separate protocol and band pairs that may be selected there from.

The method 600 continues by selecting an actual RAT and band (e.g., a protocol and band pair), as shown in a block 630. The method 600 continues by identifying one or more operational parameters for adjusting a transmitter module and/or receiver module, as shown in a block 640. A number of system/hardware operational parameters are applied that allow a most efficient operation in accordance with the selected RAT and band (e.g., a protocol and band pair).

This may involve computing the operational parameters, as shown in a block 642. Alternatively, this may involve computing retrieving the operational parameters from a storage device (e.g., an HDD, registers, memory, and/or other storage device, etc.), as shown in a block 642. Various modules (e.g., microprocessors, firmware, microcode, etc.) can be employed to determine and/or calculate the operational parameters.

In even another embodiment, a combination mode of operating in which some of the operational parameters are calculated, some of the operational parameters are retrieved from a storage device, and/or some operational parameters are determined using some calculations and some stored information may also be employed without departing from the scope and spirit of the invention.

As in a communication device application, the communication device (e.g., a UE terminal) resumes operation, and the method 600 continues by starting a transmission and/or reception using a transmitter module and/or receiver module therein, as shown in a block 650. The method 600 continues by determining whether a need for changing an RAT and/or band (e.g., protocol and band pair) is needed, as shown in a decision block 660. This need for a change request may be based on a request that is issued for change of RAT or band (e.g., a handover).

If a change of an RAT and/or band (e.g., protocol and band pair) is needed, then the method 600 operates by selecting another RAT and/or band (e.g., protocol and band pair) by re-performing the operation in the block 630. Alternatively, if a change of an RAT and/or band (e.g., protocol and band pair) is not needed, then the method 600 continues by continuing the transmission and/or reception using the transmitter module and/or receiver module therein, as shown in a block 670.

There are a wide variety of communication system contexts in which this method 600 may be performed. Some examples of various RATs include Global System for Mobile Communications (GSM), Enhanced Data Rates for GSM Evolution (EDGE), Code Division Multiple Access (CDMA), Wideband-Code Division Multiple Access (W-CDMA), UTRA-UTRAN Long Term Evolution (LTE), WiMAX (Worldwide Interoperability for Microwave Access), WiFi/WLAN (Wireless Local Area Network), ZigBee, Bluetooth, Ultra-Wide Band (UWB), and/or other types and variations thereof.

The settings (e.g., operational parameters) are retrieved from some storage media (e.g., from memory, RAM/ROM, registers, HDD, etc.), computed (e.g., using software code, a microprocessor, a dedicated finite state machine (FSM), etc.), or using some combination thereof. The settings may be different per band and per RAT, in order to achieve more efficient operation across multiple protocols and/or bands.

It is also noted that the operational parameters, for the transmit operation (e.g., for adjusting one or more operational parameters within a transmitter module) may be determined by selecting the optimum comparison frequency ($F_{comp}$) of the transmit frequency synthesizer used in the transceiver (i.e. to generate the transmit frequency) so as no harmonics (spurs) are produced that would violate the communication standard requirements (e.g., spur emissions requirements).

The harmonics (spurious emissions), depicted below as $F_{harm}$, produced by this may be calculated as follows:

$$F_{harm}=F_{TX}\pm(N\times F_{comp}),$$

where N is an integer positive number. The variable, $F_{TX}$, is the transmit frequency for a protocol and band pair (e.g., based on a particular communication standard. The comparison frequency is adjusted in each case in order to comply with the respective requirements for spur emissions for the various transmit bands (e.g., GSM850, EGSM900, PCS1900, DCS1800, 3GPP, Bands I-XVI, etc).

Then, the process continues by setting the optimum operating conditions for the various RFIC (radio frequency integrated circuit) blocks according to RAT and band requirements (e.g., power/performance optimization). This can involve adjusting operational parameters of a voltage controlled oscillator used in the transmit frequency synthesizer (TX-VCO) (e.g., TX-VCO settings) to achieve required phase noise performance, immunity to frequency pulling, etc. This can also involve adjusting transmit local oscillator (TX-LO) buffering strength to achieve required phase noise performance, minimize phase/amplitude mismatch. With respect to a mixer/modulator employed (e.g., such as may be employed to perform frequency conversion or in-phase/quadrature (I/Q) up-conversion), the process can involve adjusting/calibrating the transmit mixer frequency tuning and linearity level.

When a polar transmitter is employed, the process can involve adjusting/calibrating the phase modulator frequency tuning and linearity level thereof. When a power amplifier (PA) is employed, the process can involve adjusting the frequency tuning and output power and linearity levels. When a digital to analog converter (DAC) is employed, the process can involve adjusting the sampling rate (e.g., power optimization). When a transmit filter is employed, the process can involve adjusting the cutoff frequency and gain (e.g., power optimization).

The settings (e.g., operational parameters) are retrieved from some storage media (e.g., from memory, RAM/ROM, registers, HDD, etc.), computed (e.g., using software code, a microprocessor, microcode, a dedicated finite state machine (FSM), etc.), or using some combination thereof. The settings may be different per band and per RAT, in order to achieve more efficient operation across multiple protocols and/or bands.

In addition, it is also noted that the operational parameters, for the receive operation (e.g., for adjusting one or more operational parameters within a receiver module) may be determined by selecting the optimum comparison frequency ($F_{comp}$) of the receive frequency synthesizer used in the transceiver (i.e. to generate the receive frequency) so as no harmonics (spurs) are produced that would violate the communication standard requirements (e.g., spur emissions requirements).

As mentioned above with respect to some other embodiments, receive synthesizer spurs at certain frequencies may degrade the receiver module's performance by interacting with unwanted signals like adjacent channels, CW blockers, TX leakage, etc., and generating interference that falls on top of the wanted RX signal. This interaction may take for example the form of an intermodulation product between a synthesizer spur and an unwanted signal or even by directly down-converting to baseband unwanted signals through the mixing with a synthesizer spur.

An example is provided for illustration. Consider a direct conversion W-CDMA receiver that operates in Band-II using an RX synthesizer reference of 26 MHz. In this case a third harmonic of the reference (e.g., 78 MHz) will appear along (above and below) with the RX LO.

1. A blocker signal that is 78/2=39 MHz below from the RX channel due to a third order RX nonlinearity will appear on top of the RX signal.

2. A blocker that is at or close to the 78 MHz (for example TX leakage is 80 MHz) will be down-converted on top (or partially on top) of the wanted signal. A W-CDMA signal bandwidth is approximately 3.84 MHz; in this case part of the TX leakage that occupies 80±1.92 MHz (specifically the portion from freq 78.08 MHz up to 79.92 MHz) will be down-converted inside the wanted channel.

Then, the process continues by setting the optimum operating conditions for the various RFIC (radio frequency integrated circuit) blocks according to RAT and band requirements (e.g., power/performance optimization). This can involve adjusting operational parameters of a receive voltage controlled oscillator (RX-VCO) (e.g., RX-VCO settings) to achieve required phase noise performance, immunity to frequency pulling, etc. This can also involve adjusting local oscillator (LO) buffering strength to achieve required phase noise performance, minimize phase/amplitude mismatch.

With respect to an LNA (Low Noise Amplifier) employed, the process can involve adjusting the LNA for Noise Figure, IIP3 requirements, frequency tuning. With respect to a receive mixer employed, the process can involve adjusting the receive mixer settings for optimum IIP2, conversion gain, noise figure. With respect to a channel select filter employed, the process can involve adjusting the channel select filter to select filter frequency cutoff, filter order, gain. When an analog to digital converter (ADC) is employed, the process can involve adjusting the sampling rate (e.g., power optimization).

The settings (e.g., operational parameters) are retrieved from some storage media (e.g., from memory, RAM/ROM, registers, HDD, etc.), computed (e.g., using software code, a microprocessor, microcode, a dedicated finite state machine (FSM), etc.), or using some combination thereof. The settings may be different per band and per RAT, in order to achieve more efficient operation across multiple protocols and/or bands.

Figure 7:
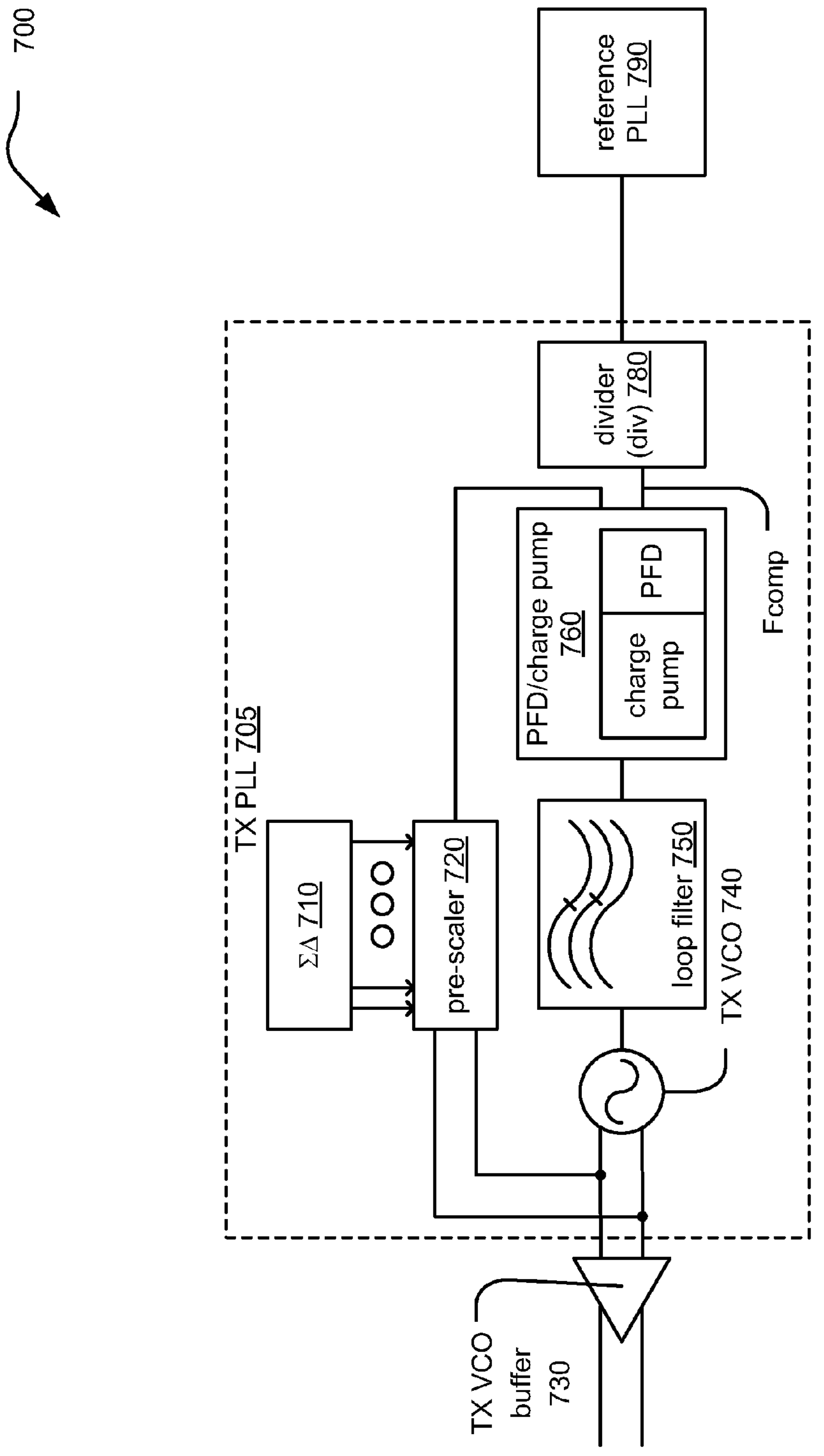
FIG. 7 is a diagram illustrating an embodiment of a first group of components that are configurable and adjustable within a transmitter module.

FIG. 7 is a diagram illustrating an embodiment 700 of a first group of components that are configurable and adjustable within a transmitter module. A reference phase locked loop (PLL) 790 provides a reference signal to a TX PLL 705. Therein, a divider 780 initially operates by dividing down the reference signal to generate the comparison frequency ($F_{comp}$) which is provided to a phase/frequency detector and charge pump module 760 that includes a charge pump and a phase/frequency detector that generates a VCO control signal that is passed through a loop filter 750 before being provided to a TX VCO 740 for generating an output signal that is then passed through a TX VCO buffer 730 before being ultimately output as a radio frequency (RF) signal. In the feedback path of the TX PLL 705 is a pre-scaler 720, controlled by a sigma-delta (ΣΔ) module 710, that divides down the feedback signal that is subsequently provided to the phase/frequency detector and charge pump module 760.

Based on a selected protocol and band pair, the optimum comparison frequency ($F_{comp}$) output from the divider 780 may be selected by adjusting operational parameters within one or both of the divider 780 and the reference PLL 790. If desired, other operational parameter governing other components within the embodiment 700 can also be adjusted based on the selected protocol and band pair.

Figure 8:
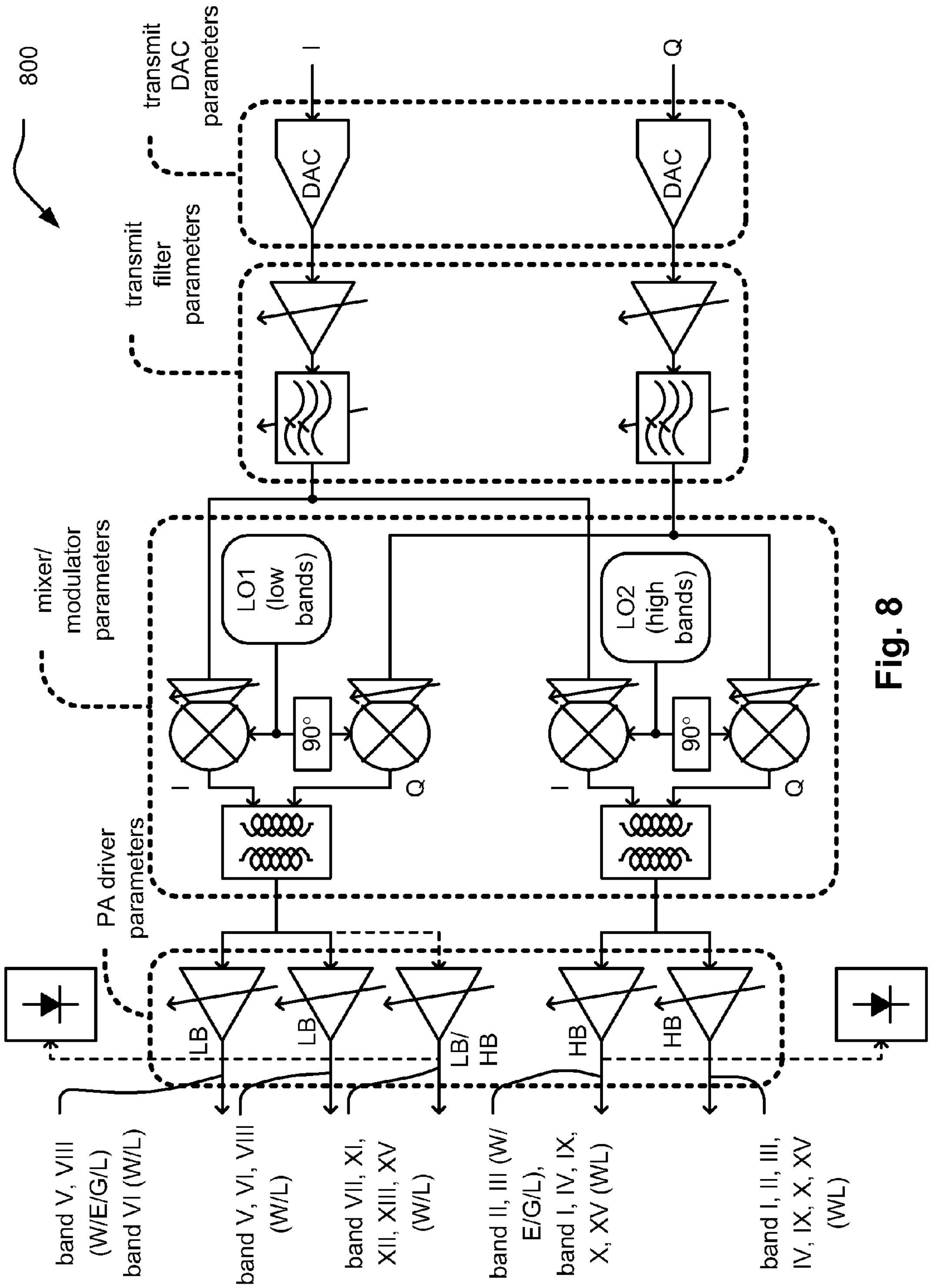
FIG. 8 is a diagram illustrating an embodiment of a second group of components that are configurable and adjustable within a transmitter module.

FIG. 8 is a diagram illustrating an embodiment 800 of a second group of components that are configurable and adjustable within a transmitter module. This embodiment 800 depicts transmitter settings that can be adjusted when up-converting I/Q to generate an output radio frequency (RF) signal to be employed in accordance with at least one protocol and band pair.

For example, this embodiment 800 includes a number of power amplifiers (PAs) (e.g., one for each of a number of possible protocol and band pair), a number of mixer/modulators (e.g., for different protocol and band pairs), transmit filters, and digital to analog converters (DACs). The operations of these various components within a communication device are controlled based on certain operational parameters.

For example, the operation of the PAs is controlled by adjusting operational parameters including gain, central frequency tuning, and linearity (e.g., a compression point).

The operation of the mixer/modulators is controlled by adjusting operational parameters including gain, central frequency tuning, and linearity (e.g., a compression point). The operation of the transmit filters is controlled by adjusting operational parameters including cutoff frequency tuning and gain. The operation of the transmit DACs is controlled by adjusting operational parameters including sampling rate.

Figure 9:
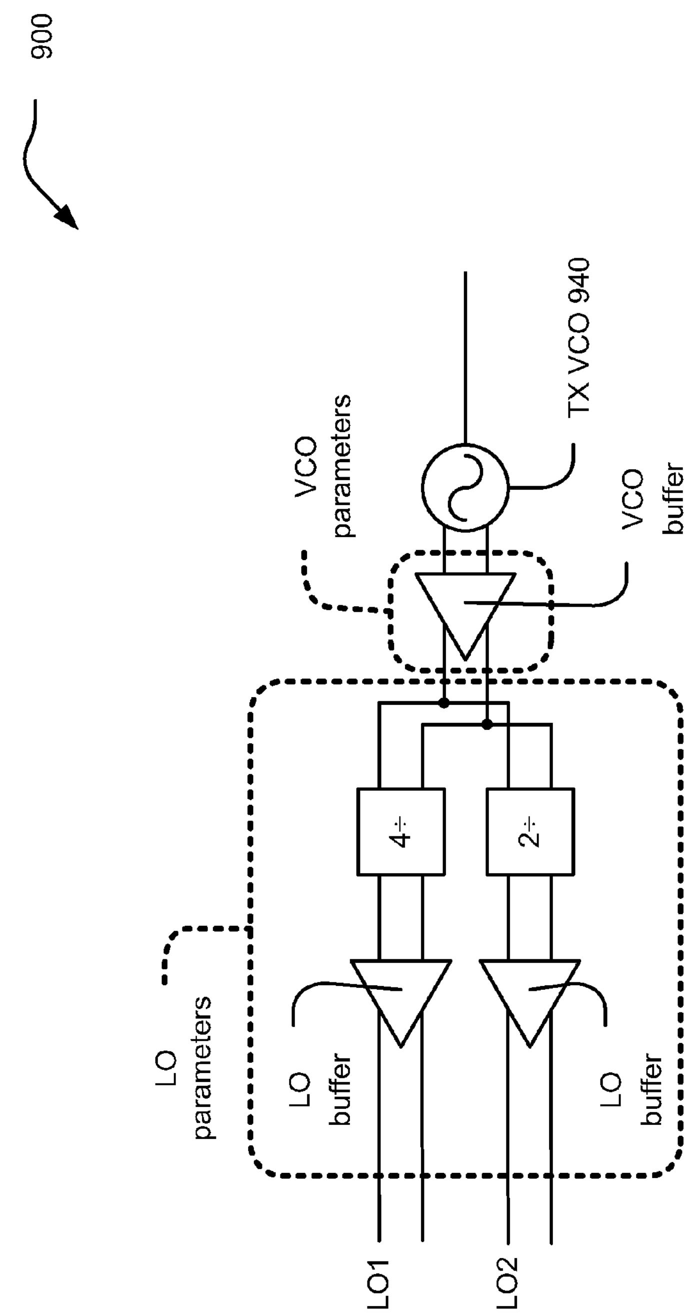
FIG. 9 is a diagram illustrating an embodiment of a third group of components that are configurable and adjustable within a transmitter module.

FIG. 9 is a diagram illustrating an embodiment 900 of a third group of components that are configurable and adjustable within a transmitter module. This embodiment 900 can be viewed as being employed in conjunction with embodiment 800 of FIG. 8. The embodiment 900 includes a TX-LO path in which a control signal is provided to a TX VCO 940 and then to a VCO buffer. Thereafter, the signal output there from is provided to two separate dividers (shown as a divide by 2 and a divide by 4 module), which are each followed by LO buffers to generate an output signal LO1 or an output signal LO2.

The operation of the VCO buffer is controlled by adjusting operational parameters like power supply voltage and current consumption that affect VCO buffer phase noise performance. The operation of the LO buffers is also controlled by adjusting operational parameters including buffer strength and current consumption in order to adjust phase noise and phase/amplitude mismatch.

Some examples of settings for various components within the TX path are provided below (e.g., with some references to FIG. 7, FIG. 8, and FIG. 9). It is noted that these particular settings of transmitter operational parameters correspond to just one embodiment, and clearly any desired settings and/or groups of settings may be employed without departing from the scope and spirit of the invention.

As described above with respect to the TX PLL 705, there is employed a comparison frequency therein (e.g., $F_{comp}$). Certain frequency ranges have strict restrictions in the presence of unwanted spurs. The presence of significant power in these certain ranges, due to an unwanted spur, is called "exception" (literally a spectrum mask violation) and the number of exceptions should be minimized. These spurs are generated according to the relationship $F_{harm}=F_{TX}\pm(N\times F_{comp})$. The goal of adjusting the $F_{comp}$ is to eliminate any exceptions. The setting of the $F_{comp}$ according to the operating band may be done using a look-up table (LUT) (e.g., depicted below) that corresponds each band to a corresponding $F_{comp}$. This table can be loaded during power-up/initialization of the terminal and can be part of the firmware. Prior art techniques tried to minimize these exceptions but with the introduction of new frequency bands over the last years, those prior art techniques are simply not sufficient any more. The reader is also referred to the Table 1400 of FIG. 14 for more detail regarding possible settings of these operational parameters Also with reference to the FIG. 7, FIG. 8, and FIG. 9, as described above with respect to the VCO operational parameters and LO parameters therein, certain settings of operational parameters related to VCO and LO settings, VCO frequency pulling, and LO phase/amplitude mismatch are described below.

VCO & LO Generation Settings:

i. Phase Noise: Based on the RAT (Radio Access Technology) and Band specifications regarding Phase Noise, adjustments may be applied that have a direct impact on the power consumption of the blocks. A set of adjustments is presented in Table 1500 of FIG. 15, where Drive Strength directly applies to power requirements (scale is from 4=Harder/Increased power to 1=Lighter/Reduced power). Again, the reader is also referred to the Table 1500 of FIG. 15 for more detail regarding possible settings of these operational parameters.

ii. VCO Frequency Pulling: If required, susceptibility to pulling can be improved by controlling/varying the impedance of certain critical nodes within the VCO circuit at the expense of silicon area and/or power consumption. This may be achieved by varying the passive load on a certain node (e.g., capacitance and/or inductance) or varying the conductance of a certain node by changing the operating condition of the active devices.

iii. LO Phase/Amplitude Mismatch: LO Generation circuit properties can be controlled in order to alleviate (to the level required by the corresponding RAT/band specs), phase and amplitude mismatch of the LO waveform. This also may be achieved by varying the passive load on a certain node (e.g., capacitance and/or inductance) or varying the conductance of a certain node by changing the operating condition of the active devices.

Also with reference to the FIG. 7, FIG. 8, and FIG. 9, as described above with respect to the modules situation before the PA (Power Amplifier) (e.g., referred to as PrePA Settings) therein, certain settings of operational parameters related to Linearity/Maximum Output Power and frequency tuning are described below.

PrePA Settings:

i. Linearity/Maximum Output Power: Different linearity on PrePA according to RAT/band—typically defined in Compression Point (CP) or Maximum Output specs—may be exploited in order to reduce excess power consumption, as CP/MaxOut performance is directly analogous to PrePA power consumption via its transconductance. An example is shown in the table below where PrePA Drive ranges from 3=Harder/Increased Power Consumption to 0=Lighter/Reduced Power Consumption

| TX Path: Max Power at PrePA Output (dBm) | | | PrePA Drive |
|---|---|---|---|
| 3GPP BANDS | 8 | 8 | 3 |
| GSM BANDS | GSM850/900 | DCS1800/PCS1900 | |
| GMSK modulation | 5 | 5 | 0 |
| 8PSK modulation | 2.5 | 0 | 2 or 1 |

ii. Frequency Tuning: Tune the frequency response of the PrePA at the output in order to achieve the optimal power gain/transfer according to RAT/band central frequency allocation. This may be achieved by varying the passive load on a certain node (e.g., capacitance and/or inductance) or varying the conductance of a certain node by changing the operating condition of the active devices.

Also with reference to the FIG. 7, FIG. 8, and FIG. 9, as described above with respect to the DACs therein, certain settings of operational parameters related to sampling rate are described below.

Digital to Analog Converters Settings:

i. Sampling rate: Set the DAC sampling frequency (Fs) such as not to be harmonically related to the TX-RX frequency separation (Duplex frequency), in order to avoid sampling images of the TX signal to fall in the RX frequency, as shown in the table below. Reduction in the sampling rate has a directly analogous effect in power consumption.

TX Path: DAC Properties Adjustment

| 3GPP BANDS | Duplex Freq. (MHz) | Fs (MHz) | Power Consumption |
|---|---|---|---|
| Band I | 190 | 80 | Lower |
| Band II | 80 | 100 | Higher |

Also with reference to the FIG. 7, FIG. 8, and FIG. 9, as described above with respect to the transmit filter modules therein, certain settings of operational parameters related to cut-off frequency and order/gain are described below.

Transmit Filter Settings:

i. Cut-off Frequency: the cutoff frequency of the filters may be chosen according to the TX channel signal bandwidth in order to reduce excess power consumption, as shown in the table below.

TX Path: Filter Properties Adjustment

| 3GPP BANDS | Channel BW (MHz) | Cutoff freq (MHz) | Power Consumption |
|---|---|---|---|
| Band I | 5/10/20 | 5/10/20 | Low/Mid/High |
| Band II | 1.4/3/5/10 | 1.4/3/5/10 | Low/Mid-Low/Mid-High/High |

ii. Order/Gain: Depending on the Adjacent and Alternate Adjacent Channel spectrum power requirements, the filter order may also be changed by engaging or disengaging filter stages. That may also result in reduction of the excess (unwanted) power consumption.

Also with reference to the FIG. 7, FIG. 8, and FIG. 9, as described above with respect to the mixer/modulators therein, certain settings of operational parameters related to linearity and frequency tuning are described below.

Mixer/Modulator Settings:

i. Linearity: Different linearity on Mixer/Modulator according to RAT/band—typically defined in IIP3 specs—may be exploited in order to reduce excess power consumption, as IIP3 Mixer/Modulator performance is directly analogous to its power consumption via its transconductance.

ii. Frequency Tuning: Tune the frequency response of the Mixer/Modulator at its output, in order to achieve the optimal power gain/transfer according to RAT/band central frequency allocation. This may be done by a) varying the passive load on a certain node (e.g., capacitance and/or inductance) or varying the conductance of a certain node by changing the operating condition of the active devices, b) switching between a multi-tap transformer, etc.

Figure 10:
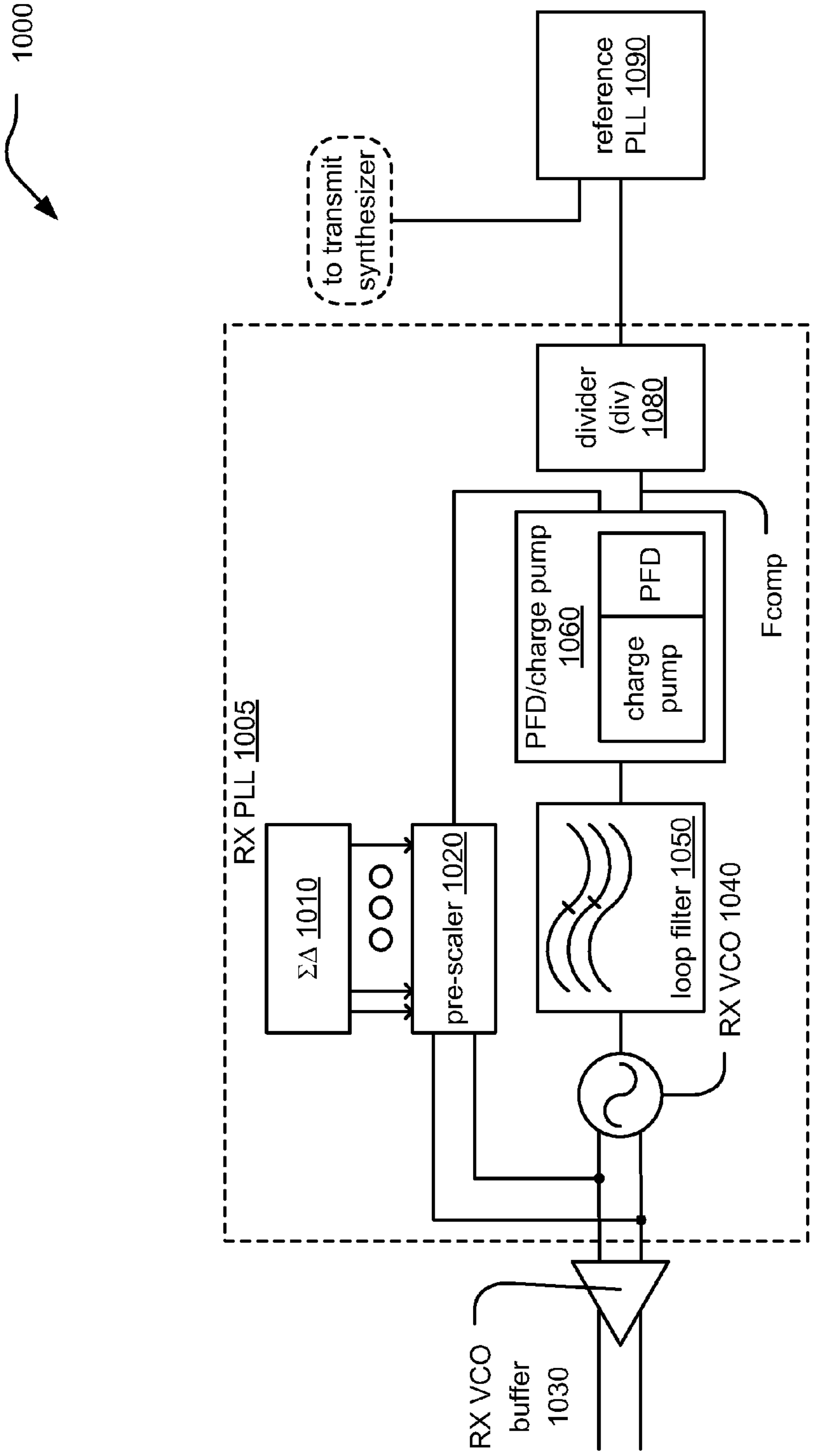
FIG. 10 is a diagram illustrating an embodiment of a first group of components that are configurable and adjustable within a receiver module.

FIG. 10 is a diagram illustrating an embodiment 1000 of a first group of components that are configurable and adjustable within a receiver module. A reference phase locked loop (PLL) 1090 provides a reference signal to a RX PLL 1005. Moreover, it is noted that the signal output from the reference PLL 1090 may also be provided to a transmit synthesizer as well. It is also noted that the reference PLL 1090 in this embodiment can be shared with the transmit synthesizer as well. For example, the reference PLL 1090 may be the same as the reference PLL 790 used in another embodiment.

Within the RX PLL 1005, a divider 1080 initially operates by dividing down the reference signal to generate the comparison frequency ($F_{comp}$) which is provided to a phase/frequency detector and charge pump module 1060 that includes a charge pump and a phase/frequency detector that generates a VCO control signal that is passed through a loop filter 1050 before being provided to a RX VCO 1040 for generating an output signal that is then passed through a RX VCO buffer 1030. In the feedback path of the TX PLL 1005 is a pre-scaler 1020, controlled by a sigma-delta (EA) module 1010, that divides down the feedback signal that is subsequently provided to the phase/frequency detector and charge pump module 1060.

Based on a selected protocol and band pair, the optimum comparison frequency ($F_{comp}$) output from the divider 10 may be selected by adjusting operational parameters within one or both of the divider 1080 and the reference PLL 1090. If desired, other operational parameter governing other components within the embodiment 1000 can also be adjusted based on the selected protocol and band pair.

Figure 11:
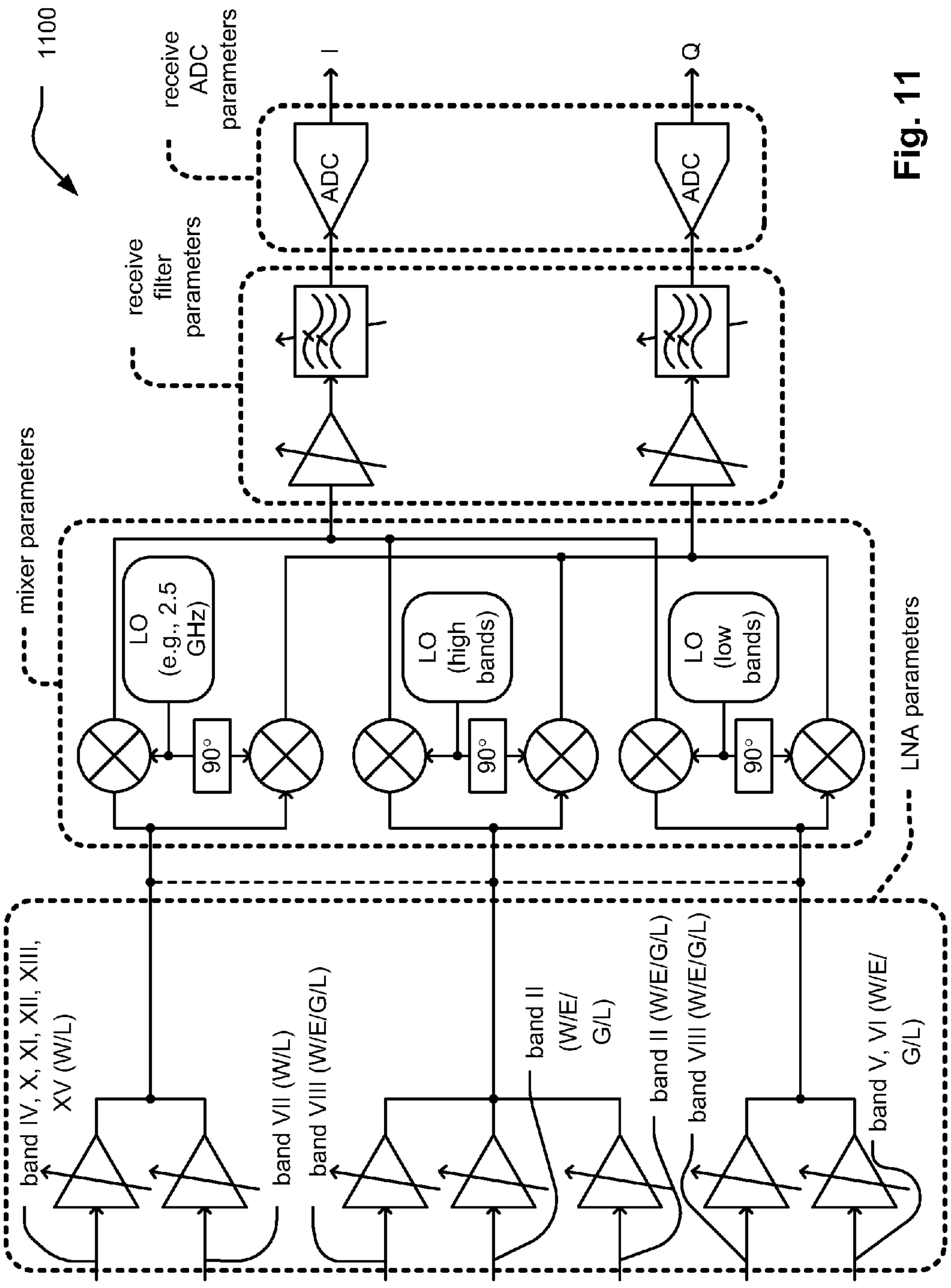
FIG. 11 is a diagram illustrating an embodiment of a second group of components that are configurable and adjustable within a receiver module.

FIG. 11 is a diagram illustrating an embodiment 1100 of a second group of components that are configurable and adjustable within a receiver module. This embodiment 1100 depicts receiver settings that can be performed when down-converting an input radio frequency (RF) signal to generate in-phase and quadrature (I/Q) baseband signals to be employed in accordance with at least one protocol and band pair.

For example, this embodiment 1100 includes a number of LNAs (Low Noise Amplifiers) (e.g., one for each of a number of possible protocol and band pair), a number of mixer (e.g., for different protocol and band pairs), receive filters, and analog to digital converters (ADCs). The operations of these various components within a communication device are controlled based on certain operational parameters.

For example, the operation of the LNAs is controlled by adjusting operational parameters including current consumption, gain, linearity (IIP3) frequency tuning, and noise figure.

The operation of the mixer is controlled by adjusting operational parameters including linearity and conversion gain (e.g., which can be done in conjunction with RX-LO adjustment). The operation of the receive filters is controlled by adjusting operational parameters including cutoff frequency tuning, filter order, and gain. The operation of the receive ADCs is controlled by adjusting operational parameters including sampling rate.

Figure 12:
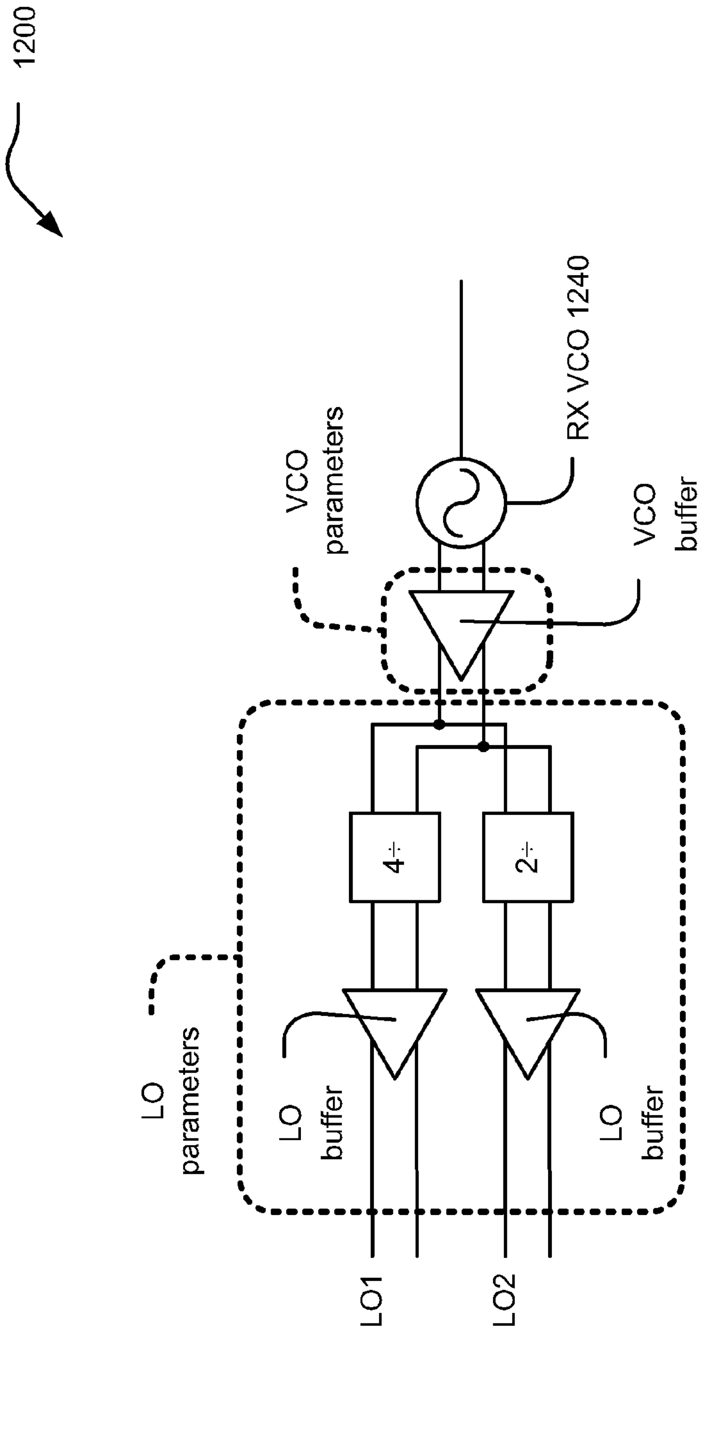
FIG. 12 is a diagram illustrating an embodiment of a third group of components that are configurable and adjustable within a receiver module.

FIG. 12 is a diagram illustrating an embodiment 1200 of a third group of components that are configurable and adjustable within a receiver module. This embodiment 1200 can be viewed as being employed in conjunction with embodiment 1100 of FIG. 11. The embodiment 1100 includes a RX-LO path in which a control signal is provided to a RX VCO 1240 and then to a VCO buffer. Thereafter, the signal output there from is provided to two separate dividers (shown as a divide by 2 a divide by 4 module), which are each followed by LO buffers to generate an output signal LO1 or an output signal LO2.

The operation of the VCO buffer is controlled by adjusting operational parameters including phase noise performance and frequency pulling. The operation of the LOs is controlled by adjusting operational parameters including buffer strength and phase noise and phase/amplitude mismatch.

Some examples of settings for various components within the RX path are provided below (e.g., with some references to FIG. 10, FIG. 11, and FIG. 12). It is noted that these particular settings of receiver operational parameters correspond to just one embodiment, and clearly any desired settings and/or groups of settings may be employed without departing from the scope and spirit of the invention.

Also with reference to the FIG. 10, FIG. 11, and FIG. 12, as described above with respect to the VCO and LOs therein, certain settings of operational parameters related to phase noise, VCO pulling, and LO phase/amplitude mismatch are described below.

VCO & LO Generation Settings:

i. Phase Noise: Based on the RAT and Band specifications regarding Phase Noise, adjustments may be applied that have a direct impact on the power consumption of the blocks. A set of adjustments is presented in Table 1600 of FIG. 16, where Drive Strength directly applies to power requirements (scale is from 4=Harder/Increased power to 1=Lighter/Reduced power). Again, the reader is also referred to the Table 1600 of FIG. 16 for more detail regarding possible settings of these operational parameters.

ii. VCO Frequency Pulling: If required, susceptibility to pulling can be improved by controlling/varying the impedance of certain critical nodes within the VCO circuit at the expense of silicon area and/or power consumption. This may be achieved by varying the passive load on a certain node (e.g., capacitance and/or inductance) or varying the conductance of a certain node by changing the operating condition of the active devices.

iii. LO Phase/Amplitude Mismatch: LO Generation circuit properties can be controlled in order to alleviate (to the level required by the corresponding RAT/band specs), phase and amplitude mismatch of the LO waveform. This may be done by varying the load (e.g. capacitance) on certain nodes. This may be achieved by varying the passive load on a certain node (e.g., capacitance and/or inductance) or varying the conductance of a certain node by changing the operating condition of the active devices.

Also with reference to the FIG. 10, FIG. 11, and FIG. 12, as described above with respect to the LNAs therein, certain settings of operational parameters related to linearity, noise figure, and frequency tuning are described below.

LNA Settings:

i. Linearity: Different linearity on LNA's according to RAT/band—typically defined in IIP3 specs—may be exploited in order to reduce excess power consumption, as IIP3 LNA performance is directly analogous to LNA power consumption via its transconductance.

RX Path: LNA Properties Adjustment

| RAT | IIP3 (dBm) | Power Consumption |
|---|---|---|
| 3GPP | −15 | Higher |
| GSM | −20 | Lower |

ii. Noise Figure: Different Noise performance—typically defined in NF specs—may be exploited in order to reduce excess power consumption, as LNA noise performance is directly analogous to LNA power consumption via its transconductance.

RX Path: LNA Properties Adjustment

| RAT | NF (dB) | Power Consumption |
|---|---|---|
| 3GPP | 3.0 | Lower |
| GSM | 2.3 | Higher |

Frequency Tuning: Tune the frequency response of the LNA at both input and output in order to achieve the optimal gain and NF according to RAT/band frequency allocation. This may be achieved by varying the passive load on a certain node (e.g., capacitance and/or inductance) or varying the conductance of a certain node by changing the operating condition of the active devices.

Also with reference to the FIG. 10, FIG. 11, and FIG. 12, as described above with respect to the channel selection filters therein, certain settings of operational parameters related to cut-off frequency and order are described below.

Channel Selection Filter Settings:

i. Cut-off Frequency: the cutoff frequency of the filters may be chosen according to the RX signal bandwidth in order to reduce excess power consumption.

RX Path: Filter Properties Adjustment

| 3GPP BANDS | Channel BW (MHz) | Cutoff freq (MHz) | Power Consumption |
|---|---|---|---|
| Band I | 5/10/20 | 5/10/20 | Low/Mid/High |
| Band II | 1.4/3/5/10 | 1.4/3/5/10 | Low/Mid-Low/Mid-High/High |

ii. Order: Depending on the Adjacent and Alternate Adjacent Channel rejection requirements, the filter order may also be changed by engaging or disengaging filter stages. That may also result in reduction of the excess (unwanted) power consumption.

Also with reference to the FIG. 10, FIG. 11, and FIG. 12, as described above with respect to the ADCs therein, certain settings of operational parameters related to sampling rate are described below.

Analog to Digital Converters Settings:

i. Sampling rate: The ADC sampling rate can be chosen taking into account the selected protocol requirements. For example when receiving an LTE protocol signal and the signal bandwidth is 1.4 MHz, then the ADC sampling may be 4×3.84 MHz while when the signal bandwidth is 3 MHz, the sampling rate can be 8×3.84 MHz. Reduction in the sampling rate has a directly analogous effect in power consumption.

RX Path: ADC Properties Adjustment

| 3GPP BANDS | Channel BW (MHz) | Fs (MHz) | Power Consumption |
|---|---|---|---|
| Band I | 5/10/20 | 16/32/64 × 3.84 | Low/Mid/High |
| Band II | 1.4/3/5/10 | 4/8/16/32 × 3.84 | Low/Mid-Low/Mid-High/High |

Also with reference to the FIG. 10, FIG. 11, and FIG. 12, as described above with respect to the mixers therein, certain settings of operational parameters related to linearity are described below.

Mixer Settings:

i. Linearity: Different linearity on Mixer according to RAT/band—typically defined in IIP3 specs—may be exploited in order to reduce excess power consumption, as the IIP3 Mixer performance is directly analogous to its power consumption via its transconductance.

Also with reference to the FIG. 10, FIG. 11, and FIG. 12, as described above with respect to the RX PLL settings therein, the reader is referred above to the example embodiments of settings for the TX PLL described above with reference to the FIG. 8, FIG. 9, and FIG. 10.

Figure 13:
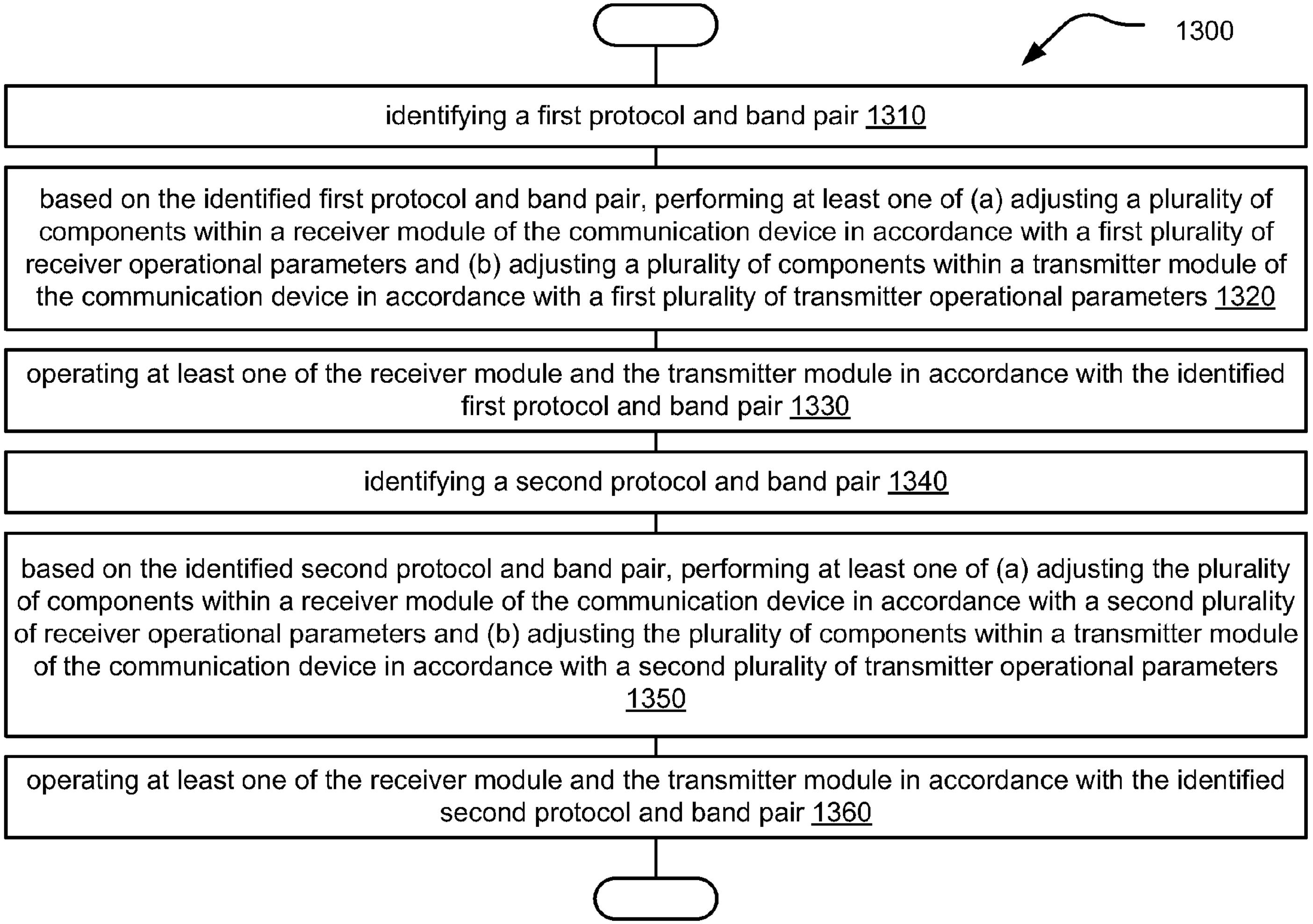
FIG. 13 is a diagram illustrating an alternative embodiment of a method for configuring and operating a communication device based on a selected protocol and band pair and selected operational parameters.

FIG. 13 is a diagram illustrating an alternative embodiment 1300 of a method for configuring and operating a communication device based on a selected protocol and band pair and selected operational parameters. The method 1300 begins by identifying a first protocol and band pair.

Then, based on the identified first protocol and band pair, as shown in a block 1320, the method 1300 continues by performing at least one of: (a) adjusting a plurality of components within a receiver module of the communication device in accordance with a first plurality of receiver operational parameters, and (b) adjusting a plurality of components within a transmitter module of the communication device in accordance with a first plurality of transmitter operational parameters.

Then, as shown in a block 1330, the method 1300 continues by operating at least one of the receiver module and the transmitter module in accordance with the identified first protocol and band pair (and its components being adjusted accordingly).

Then, as shown in a block 1340, the method 1300 continues by identifying a second protocol and band pair.

Then, based on the identified second protocol and band pair, as shown in a block 1350, the method 1300 continues by performing at least one of: (a) adjusting the plurality of components within the receiver module of the communication device in accordance with a second plurality of receiver operational parameters, and (b) adjusting the plurality of components within the transmitter module of the communication device in accordance with a second plurality of transmitter operational parameters.

Then, as shown in a block 1330, the method 1300 continues by operating at least one of the receiver module and the transmitter module in accordance with the identified second protocol and band pair (and its components being adjusted accordingly).

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A wireless communication device comprising:

a processor; and a radio, the radio and the processor configured to:

support first communications with a first other wireless communication device using a first channel based on a first setting of at least one operational parameter that governs operation of at least one component within the radio; and support second communications with at least one of the first other wireless communication device or a second other wireless communication device using a second channel based on a second setting of the at least one operational parameter that governs the operation of the at least one component within the radio.

2. The wireless communication device of claim 1, wherein the radio and the processor are further configured to:

support the first communications at or during a first time;

adjust the at least one operational parameter that governs the operation of the at least one component within the radio from the first setting to the second setting; and support the second communications at or during a second time.

3. The wireless communication device of claim 1, wherein the radio and the processor are further configured to:

adjust the at least one operational parameter that governs the operation of the at least one component within the radio from the first setting to the second setting based on a change of a protocol and band pair associated with at least one radio access technology (RAT).

4. The wireless communication device of claim 1 further comprising:

a memory configured to store information for adjustment of the at least one component within the radio; and the radio and the processor are further configured to adjust the at least one operational parameter that governs the operation of the at least one component within the radio from the first setting to the second setting based on the information stored within the memory.

5. The wireless communication device of claim 1, wherein:

a first at least one characteristic of the first channel includes at least one of a first frequency band, a first channel bandwidth, a first cutoff frequency, a first frequency carrier, a first radio frequency (RF), a first protocol and band pair, a first communication protocol, or a first communication standard; and a second at least one characteristic of the second channel includes at least one of a second frequency band, a second channel bandwidth, a second cutoff frequency, a second frequency carrier, a second RF, a second protocol and band pair, a second communication protocol, or a second communication standard.

6. The wireless communication device of claim 1, wherein:

the first channel and the second channel are both characterized by a common characteristic, wherein the common characteristic corresponds to a frequency band, a channel bandwidth, a cutoff frequency, a frequency carrier, radio frequency (RF), a protocol and band pair, a communication protocol, or a communication standard;

the first channel is also characterized by a first characteristic; and the second channel is also characterized by a second characteristic that is different than the first characteristic.

7. The wireless communication device of claim 1, wherein the at least one component within the radio comprises:

at least one of a low noise amplifier (LNA), a mixer, an analog filter, an analog to digital converter (ADC), a phase locked loop (PLL), a power amplifier (PA), a mixer/modulator, or a digital to analog converter (DAC).

8. The wireless communication device of claim 1 further comprising:

a mobile terminal, wherein the first other wireless communication device includes another mobile terminal, an access point (AP), or a base station.

9. A wireless communication device comprising:

a processor; and a radio, the radio and the processor configured to:

support first communications with a first other wireless communication device using a first channel based on a first setting of at least one operational parameter that governs operation of at least one component within the radio, wherein the first channel is associated with at least one of a first protocol and band pair, a first communication protocol, or a first communication standard;

adjust the at least one operational parameter that governs the operation of at least one component within the radio from the first setting to a second setting; and support second communications with at least one of the first other wireless communication device or a second other wireless communication device using a second channel based on the second setting of the at least one operational parameter that governs the operation of the at least one component within the radio, wherein the second channel is associated with at least one of a second protocol and band pair, a second communication protocol, or a second communication standard.

10. The wireless communication device of claim 9, wherein:

the first channel and the second channel are both characterized by a common characteristic, wherein the common characteristic corresponds to a frequency band, a channel bandwidth, a cutoff frequency, a frequency carrier, or radio frequency (RF);

the first channel is also characterized by a first characteristic; and the second channel is also characterized by a second characteristic that is different than the first characteristic.

11. The wireless communication device of claim 9 further comprising:

a memory configured to store information for adjustment of the at least one component within the radio; and the radio and the processor are further configured to adjust the at least one operational parameter that governs the operation of the at least one component within the radio from the first setting to the second setting based on the information stored within the memory.

12. The wireless communication device of claim 9, wherein the at least one component within the radio comprises:

at least one of a low noise amplifier (LNA), a mixer, an analog filter, an analog to digital converter (ADC), a phase locked loop (PLL), a power amplifier (PA), a mixer/modulator, or a digital to analog converter (DAC).

13. The wireless communication device of claim 9 further comprising:

a mobile terminal, wherein the first other wireless communication device includes another mobile terminal, an access point (AP), or a base station.

14. A method for execution by a wireless communication device, the method comprising:

supporting, via a communication interface of the wireless communication device, first communications with a first other wireless communication device using a first channel based on a first setting of at least one operational parameter that governs operation of at least one component within the wireless communication device; and supporting, via the communication interface of the wireless communication device, second communications with at least one of the first other wireless communication device or a second other wireless communication device using a second channel based on a second setting of the at least one operational parameter that governs the operation of the at least one component within the wireless communication device.

15. The method of claim 14 further comprising:

supporting the first communications at or during a first time;

adjusting the at least one operational parameter that governs the operation of the at least one component within the wireless communication device from the first setting to the second setting; and supporting the second communications at or during a second time.

16. The method of claim 14 further comprising:

adjusting the at least one operational parameter that governs the operation of the at least one component within the wireless communication device from the first setting to the second setting based on a change of a protocol and band pair associated with at least one radio access technology (RAT).

17. The method of claim 14, wherein:

a first at least one characteristic of the first channel includes at least one of a first frequency band, a first channel bandwidth, a first cutoff frequency, a first frequency carrier, a first radio frequency (RF), a first protocol and band pair, a first communication protocol, or a first communication standard; and a second at least one characteristic of the second channel includes at least one of a second frequency band, a second channel bandwidth, a second cutoff frequency, a second frequency carrier, a second RF, a second protocol and band pair, a second communication protocol, or a second communication standard.

18. The method of claim 14, wherein:

the first channel and the second channel are both characterized by a common characteristic, wherein the common characteristic corresponds to a frequency band, a channel bandwidth, a cutoff frequency, a frequency carrier, radio frequency (RF), a protocol and band pair, a communication protocol, or a communication standard;

the first channel is also characterized by a first characteristic; and the second channel is also characterized by a second characteristic that is different than the first characteristic.

19. The method of claim 14, wherein the at least one component within the wireless communication device comprises:

at least one of a low noise amplifier (LNA), a mixer, an analog filter, an analog to digital converter (ADC), a phase locked loop (PLL), a power amplifier (PA), a mixer/modulator, or a digital to analog converter (DAC).

20. The method of claim 14, wherein the wireless communication device is a mobile terminal, and the first other wireless communication device includes another mobile terminal, an access point (AP), or a base station.

* * * * *